(12) United States Patent
Ishimitsu et al.

(10) Patent No.: US 10,337,477 B2
(45) Date of Patent: Jul. 2, 2019

(54) INTERNAL COMBUSTION ENGINE FUEL SUPPLY SYSTEM AND INTERNAL COMBUSTION ENGINE FUEL SUPPLY METHOD

(71) Applicant: HONDA MOTOR CO., LTD., Tokyo (JP)

(72) Inventors: Kengo Ishimitsu, Wako (JP); Daiko Tsutsumi, Wako (JP); Hiroshi Chishima, Wako (JP); Kohei Kuzuoka, Wako (JP); Tadashi Kurotani, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 228 days.

(21) Appl. No.: 15/358,134

(22) Filed: Nov. 22, 2016

(65) Prior Publication Data

US 2017/0145969 A1 May 25, 2017

(30) Foreign Application Priority Data

Nov. 25, 2015 (JP) ................................. 2015-229528

(51) Int. Cl.
*B01D 61/36* (2006.01)
*B60K 15/03* (2006.01)
*F02M 37/22* (2019.01)

(52) U.S. Cl.
CPC ........... *F02M 37/22* (2013.01); *B01D 61/362* (2013.01); *B01D 61/366* (2013.01);
(Continued)

(58) Field of Classification Search
CPC .... F02M 37/22; F02M 37/223; B01D 61/368; B01D 61/366; B01D 61/362; B01D 61/36; B01D 61/364; B60K 15/03; B60K 2015/03355; B60K 2015/03157; B60K 2015/03118; B60K 2015/03131; B60K 2015/03144; B60K 2015/03151;
(Continued)

(56) References Cited

U.S. PATENT DOCUMENTS 5,467,641 A * 11/1995 Williams ......... B60K 15/03504
340/605
8,580,111 B2 * 11/2013 Partridge ............... B01D 61/36
123/3

(Continued)

FOREIGN PATENT DOCUMENTS

JP    2004-522039    7/2004

*Primary Examiner* — Joseph W Drodge
(74) *Attorney, Agent, or Firm* — Mori & Ward, LLP

(57) ABSTRACT

An internal combustion engine fuel supply system includes a first fuel tank, a separator, and circuitry. The first fuel tank is to store fuel. The separator is connected to the first fuel tank to separate the fuel supplied from the first fuel tank into a high octane fuel and a low octane fuel which are to be supplied to an internal combustion engine. The high octane fuel has a first octane number. The low octane fuel has a second octane number lower than the first octane number. The circuitry is configured to determine whether fuel has been supplied to the first fuel tank, and to operate the separator to separate the fuel into the high octane fuel and the low octane fuel when it is determined that fuel has been supplied to the first fuel tank.

10 Claims, 6 Drawing Sheets

(52) U.S. Cl.
CPC ............ *B01D 61/368* (2013.01); *B60K 15/03* (2013.01); *B60K 2015/03157* (2013.01); *B60K 2015/03355* (2013.01)

(58) Field of Classification Search
CPC .. B60K 2015/0319; B60K 2015/03197; B60K 2015/03203; B60K 2015/03217; B60K 2015/03223
USPC ..... 210/640, 650, 651, 739, 774, 85, 86, 97, 210/172.1, 175, 184, 321.6; 123/1 A, 3, 123/304, 575–578
See application file for complete search history.

(56) References Cited

U.S. PATENT DOCUMENTS

| | | | |
|---|---|---|---|
| 2002/0139111 A1* | 10/2002 | Ueda ................. | B01D 61/36 60/285 |
| 2002/0162457 A1* | 11/2002 | Hyodo ............... | F02M 25/089 96/109 |
| 2005/0103285 A1* | 5/2005 | Oda ................... | F02B 51/00 123/3 |
| 2010/0155315 A1* | 6/2010 | Partridge ........... | B01D 19/0031 210/149 |
| 2014/0124419 A1* | 5/2014 | Chishima ........... | F02D 19/0634 210/90 |
| 2015/0052877 A1* | 2/2015 | Leone ................ | F02D 19/0649 60/273 |
| 2017/0145969 A1* | 5/2017 | Ishimitsu ........... | B01D 61/362 |

\* cited by examiner

INTERNAL COMBUSTION ENGINE FUEL SUPPLY SYSTEM AND INTERNAL COMBUSTION ENGINE FUEL SUPPLY METHOD

CROSS-REFERENCE TO RELATED APPLICATIONS

The present application claims priority under 35 U.S.C. § 119 to Japanese Patent Application No. 2015-229528, filed Nov. 25, 2015, entitled "Internal Combustion Engine Fuel Supply System." The contents of this application are incorporated herein by reference in their entirety.

BACKGROUND

1. Field

The present disclosure relates to an internal combustion engine fuel supply system and an internal combustion engine fuel supply method.

2. Description of the Related Art

The technology described in Japanese Unexamined Patent Application Publication (Translation of PCT Application) No. 2004-522039 is an example of a known internal combustion engine fuel supply system of this type. In this fuel supply system, fuel supplied from a fuel tank to a separator device is separated into high octane fuel and low octane fuel by the separator device. The separated low octane fuel is directly supplied to the internal combustion engine from the separator device, rather than being stored in a tank or the like.

However, the separated high octane fuel is stored in a dedicated sub tank, and is supplied to the internal combustion engine from the sub tank when the internal combustion engine is in a state operating under high load. Accordingly, good performance of the internal combustion engine in terms of output, fuel consumption, and the like is maintained due to effectively suppressing knocking, in a state in which the ignition timing is maintained at an advanced side. Moreover, the separator device is operated when the liquid surface level of the high octane fuel in the sub tank has dropped to a specific lower limit value, thereby securing the amount of high octane fuel.

SUMMARY

According to one aspect of the present disclosure, an internal combustion engine fuel supply system separates fuel into high octane fuel with a higher octane number and low octane fuel with a lower octane number, and supplies fuel to an internal combustion engine. The internal combustion engine fuel supply system includes: a first fuel tank that stores fuel that has been refueled; a separator device that separates fuel supplied from the first fuel tank into high octane fuel and low octane fuel; a second fuel tank that stores the separated high octane fuel; a refueling determination unit that determines whether or not fuel has been refueled in the first fuel tank; and a controller that causes the separator device to operate when determined that fuel has been refueled in the first fuel tank.

According to another aspect of the present disclosure, an internal combustion engine fuel supply system includes a first fuel tank, a separator, and circuitry. The first fuel tank is to store fuel. The separator is connected to the first fuel tank to separate the fuel supplied from the first fuel tank into a high octane fuel and a low octane fuel which are to be supplied to an internal combustion engine. The high octane fuel has a first octane number. The low octane fuel has a second octane number lower than the first octane number. The circuitry is configured to determine whether fuel has been supplied to the first fuel tank, and to operate the separator to separate the fuel into the high octane fuel and the low octane fuel when it is determined that fuel has been supplied to the first fuel tank.

According to further aspect of the present disclosure, an internal combustion engine fuel supply method includes determining whether fuel has been supplied to a first fuel tank to store the fuel. A separator is operated to separate the fuel supplied from the first fuel tank into a high octane fuel and a low octane fuel which are to be supplied to an internal combustion engine when it is determined that fuel has been supplied to the first fuel tank. The high octane fuel has a first octane number. The low octane fuel has a second octane number lower than the first octane number.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
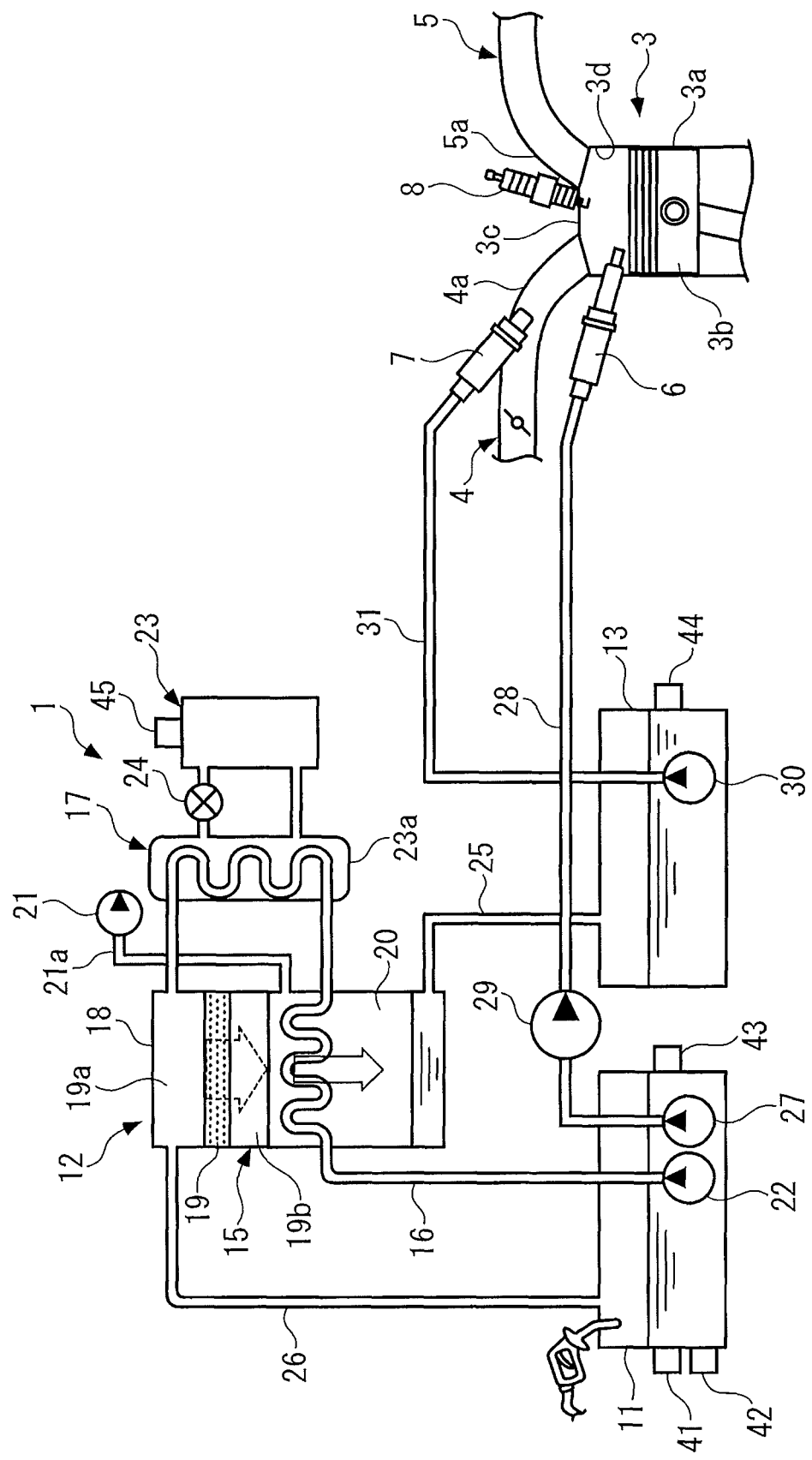
FIG. 1 is a schematic drawing illustrating a fuel supply system according to an embodiment of the present disclosure, together with an internal combustion engine.

The embodiment(s) will now be described with reference to the accompanying drawings, wherein like reference numerals designate corresponding or identical elements throughout the various drawings.

Detailed explanation follows regarding a preferable embodiment of the present disclosure, with reference to the drawings. FIG. 1 illustrates a fuel supply device 1 according to the present embodiment, together with an internal combustion engine (referred to below as an "engine") 3.

The engine 3 is installed as a motive power source of a vehicle (not illustrated in the drawings), and is, for example, a gasoline engine with four cylinders 3a (only one of which is illustrated). A fuel chamber 3d is formed between a piston 3b and a cylinder head 3c of each cylinder 3a. An air intake path 4 is connected to the fuel chamber 3d through an air intake manifold 4a, and an exhaust path 5 is connected to the fuel chamber 3d through an exhaust manifold 5a.

Figure 2:
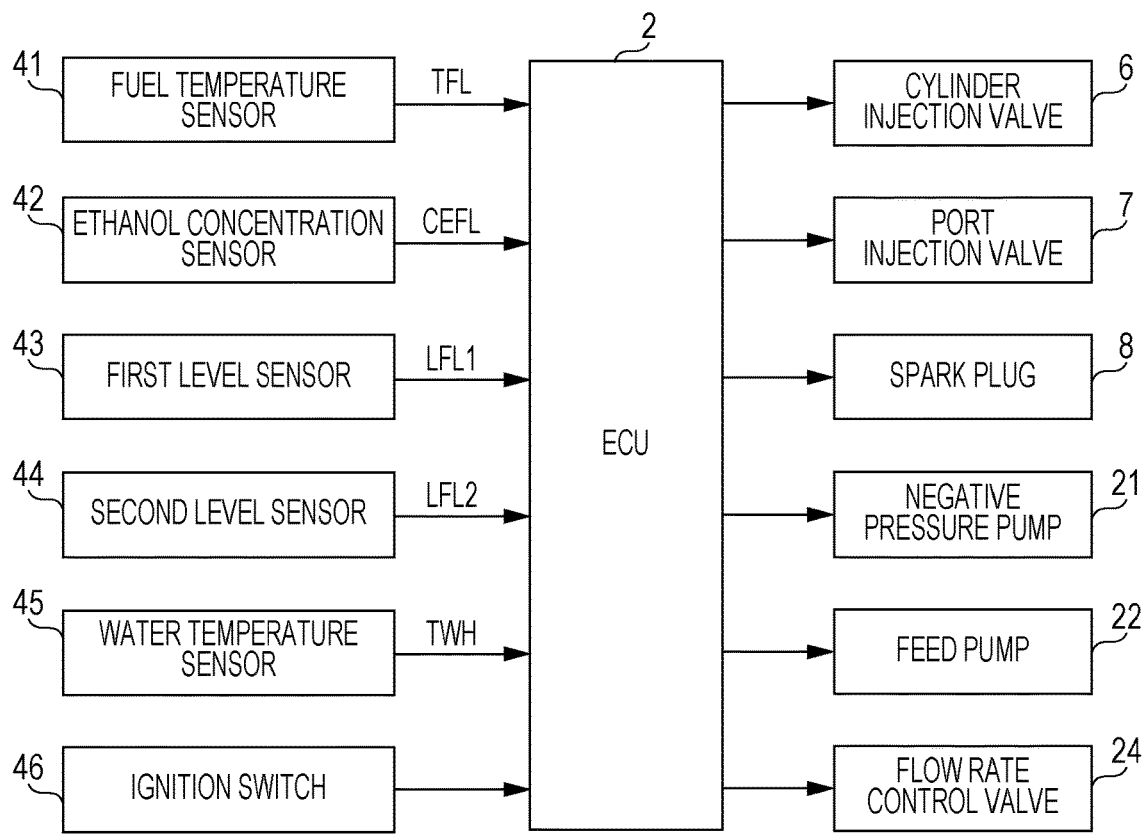
FIG. 2 is a block diagram illustrating a controller and the like of a fuel supply system.

In each cylinder 3a, a cylinder injection valve 6 that injects fuel directly into the cylinder 3a is provided at the side of the cylinder head 3c, and a port injection valve 7 that injects fuel toward an air intake port is provided to the air intake manifold 4a. Moreover, the cylinder head 3c of each cylinder 3a is further provided with a spark plug 8 for igniting a mixture of fuel and air generated inside the fuel chamber 3d. Operation of the cylinder injection valve 6, the port injection valve 7, and the spark plug 8 is controlled by an ECU 2, illustrated in FIG. 2.

The fuel supply device 1 includes a main tank 11 that is filled with fuel, a separation device 12 that separates fuel supplied from the main tank 11 into high octane fuel and low octane fuel, and a sub tank 13 that stores the separated high octane fuel. The present embodiment anticipates that the fuel with which the main tank 11 is filled is gasoline containing an ethanol component (high octane component).

The separation device 12 includes a separator 15 that performs a fuel separation operation, a fuel path 16 that supplies fuel from the main tank 11 to the separator 15, a heater 17 that heats the fuel supplied to the separator 15, and the like.

The separator 15 is configured including a separation membrane 19 and a condenser 20 that are housed in a housing 18, and the like. The separation membrane 19 is disposed in an upper portion of the housing 18, and partitions a high pressure chamber 19a from a low pressure chamber 19b, at an upper side and a lower side of the separation membrane 19 respectively. The separation membrane 19 is of a known configuration. The ethanol component of the fuel supplied into the high pressure chamber 19a is selectively passed through the separation membrane 19, such that gaseous high octane fuel with a higher octane number than the supplied fuel flows into the low pressure chamber 19b, and liquid low octane fuel with a lower octane number than the supplied fuel remains in the high pressure chamber 19a.

The condenser 20 is disposed adjacent to the lower side of the low pressure chamber 19b, and is in communication with the low pressure chamber 19b. The condenser 20 condenses the gaseous high octane fuel that has flowed in from the low pressure chamber 19b to convert it to liquid high octane fuel. A negative pressure pump 21 for controlling a negative pressure state in the condenser 20 and the low pressure chamber 19b is connected to the condenser 20 through a negative pressure path 21a.

One end of the fuel path 16 is connected to a feed pump 22 provided inside the main tank 11. The fuel path 16 extends so as to pass in sequence through the condenser 20 and a cooling water chamber 23a, described later, of the heater 17, and the other end of the fuel path 16 is connected to the high pressure chamber 19a of the separator 15. Note that portions of the fuel path 16 inside the condenser 20 and the cooling water chamber 23a are formed in coil shapes so as to promote heat exchange between the fuel inside the fuel path 16 and the gaseous high octane fuel, and between the fuel inside the fuel path 16 and cooling water in the cooling water chamber 23a.

The heater 17 uses the cooling water inside the cooling water chamber 23a as a heat source to heat or warm the fuel to be supplied to the separator 15. The cooling water chamber 23a configures part of a cooling water circuit 23 that circulates cooling water of the engine 3, and is filled with the cooling water in a state in which the cooling water circulated through the cooling water circuit 23 flows in and out of the cooling water chamber 23a. A flow rate control valve 24 for controlling the flow rate of the cooling water is provided in the vicinity of an inlet of the cooling water chamber 23a.

According to the above configuration, during operation of the separator device 12 (the separator 12), when the negative pressure pump 21 and the feed pump 22 are actuated, fuel inside the main tank 11 is conveyed into the fuel path 16 in a state pressurized by the feed pump 22. After being heated or warmed by undergoing heat exchange with the cooling water as it passes through the cooling water chamber 23a, the fuel flows into the high pressure chamber 19a of the separator 15.

The fuel that has flowed into the high pressure chamber 19a is separated into gaseous high octane fuel with a higher octane number, and liquid low octane fuel with a lower octane number, by the action of the separation membrane 19 described above. The gaseous high octane fuel flows from the separation membrane 19 and through the low pressure chamber 19b into the condenser 20, and is condensed and converted into a liquid due to being cooled by heat exchange with the fuel flowing through the fuel path 16. The liquid high octane fuel flows from a bottom portion of the housing 18 and through a high octane fuel path 25 into the sub tank 13, where it is stored.

As described above, the fuel in the main tank 11 (referred to below as the "main tank fuel") is employed as a source material for generating the high and low octane fuel, and is also employed as a coolant for cooling and condensing the gaseous high octane fuel in the condenser 20. During this cooling, the fuel is warmed somewhat due to the heat exchange with the gaseous high octane fuel, before being further heated or warmed by the heater 17.

The liquid low octane fuel separated by the separation membrane 19 is returned from the high pressure chamber 19a to the main tank 11 through a return path 26. Fuel that has been refueled and low octane fuel retuned from the separator device 12 are thereby stored in a mixed state in the main tank 11, and the octane number of the main tank fuel decreases as separation of the fuel by the separator device 12 progresses.

The main tank fuel in the main tank 11 is conveyed to a first fuel supply path 28 by a low pressure pump 27, is supplied to the cylinder injection valve 6 in a state in which the pressure has been increased by a high pressure pump 29 provided partway along the first fuel supply path 28, and is injected into the fuel chamber 3d from the cylinder injection valve 6. The high octane fuel inside the sub tank 13 is supplied to the port injection valve 7 through a second fuel supply path 31 by a pump 30, and is injected toward the air intake port from the port injection valve 7.

The main tank 11 is provided with a fuel temperature sensor 41, an ethanol concentration sensor 42, and a first level sensor 43. The respective sensors 41 to 43 detect a main tank fuel temperature TFL, an ethanol concentration CEFL, and a liquid surface level LFL1, and output detection signals to the ECU 2.

The sub tank 13 is provided with a second level sensor 44. The second level sensor 44 detects a liquid surface level LFL2 of the high octane fuel, and outputs detection signals to the ECU 2. The cooling water circuit 23 of the heater 17 is provided with a water temperature sensor 45 at a position upstream of the flow rate control valve 24. The water temperature sensor 45 detects a temperature (cooling water temperature) TWH of the cooling water in the cooling water circuit 23, and outputs detection signals to the ECU 2. Signals indicating an ON/OFF state of an ignition switch 46 are also output to the ECU 2 from the ignition switch 46 (see FIG. 2).

The ECU 2 is configured by a microcomputer including a CPU, RAM, ROM, an I/O interface (none of which are illustrated in the drawings), and the like. The ECU 2 controls the separator device 12 (see FIG. 2) by controlling operation of the negative pressure pump 21 of the separator device 12, the feed pump 22, the flow rate control valve 24, and the like in response to the detection signals from the various sensors 41 to 45 described above according to a control program stored in the ROM. Note that in the present embodiment, the ECU 2 corresponds to a refueling determination unit, a controller, a high octane fuel amount parameter acquisition unit, and circuitry.

Figure 3:
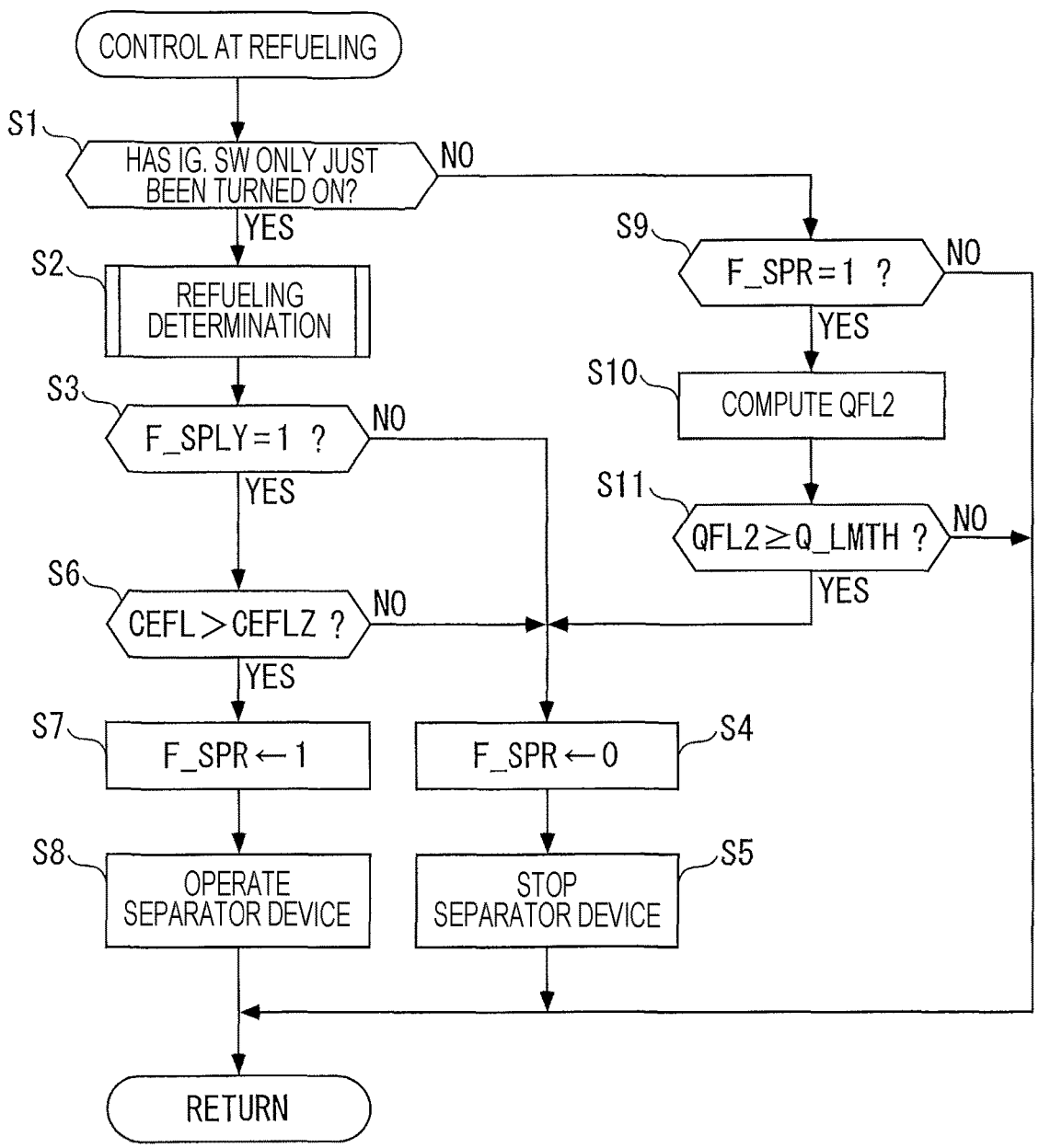
FIG. 3 is a flowchart illustrating control processing at refueling for a separator device (a separator) according to a first embodiment.

Next, explanation follows regarding control processing at refueling for the separator device 12 according to a first embodiment of the present disclosure, with reference to FIG. 3. This processing is used to operate the separator device 12 when specific conditions have been met at refueling, in order to secure a high octane fuel amount. This processing is executed repeatedly by the ECU 2 at a specific time interval.

In this processing, first, at step 1 (written "S1" in the drawings; similar applies below), determination is made as to whether or not the current processing cycle corresponds to a processing cycle immediately after the ignition switch (IG. SW) 46 has been turned ON. If the answer is YES, processing transitions to step 2, and refueling determination processing is executed.

Figure 4:
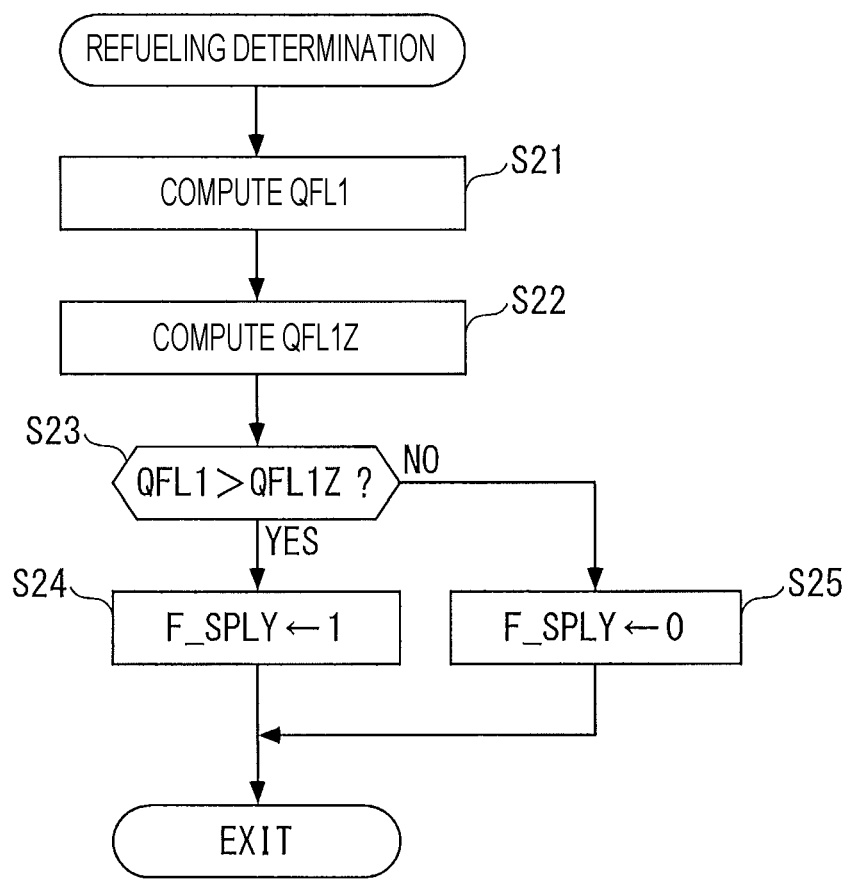
FIG. 4 is a flowchart illustrating a sub-routine for refueling determination processing, illustrated in FIG. 3.

FIG. 4 illustrates a sub-routine for the refueling determination processing. In this processing, first, at step 21, a main tank fuel amount QFL1 inside the main tank 11 is computed. The main tank fuel amount QFL1 is computed by, for example, multiplying the liquid surface level LFL1 detected by the first level sensor 43 at that point in time by the lateral cross-section area of the main tank 11.

Next, a main tank fuel amount (referred to below as the "previous main tank fuel amount") QFL1Z corresponding to just before the previous occasion that the IG. SW 46 was turned off is computed (step 22). The previous main tank fuel amount QFL1Z is computed by, for example, multiplying the lateral cross-section area of the main tank 11 by the liquid surface level LFL1, stored in the RAM, that was detected just before the IG. SW 46 was turned off.

Next, determination is made as to whether or not the main tank fuel amount QFL1 is larger than the previous main tank fuel amount QFL1Z (step 23). If the answer is YES, and QFL1>QFL1Z, determination is made that fuel has been refueled in the main tank 11 between switching the IG. SW 46 OFF and ON. A refueling flag F_SPLY indicating this fact is set to 1 (step 24), and the processing is ended.

However, if the answer at step 23 above is NO, then determination is made that fuel has not been refueled. The refueling flag F_SPLY is set to 0 (step 25), and the processing is ended.

Returning to FIG. 3, at step 3 following the refueling determination processing executed at step 2, determination is made as to whether or not the refueling flag F_SPLY is at 1. If the answer is NO and determination is made that fuel has not been refueled, a separator device operation flag F_SPR is set to 0 (step 4) to indicate that the separator device 12 is not to be operated. The separator device 12 is kept in an inactive state (step 5), and the processing is ended.

If the answer at step 3 is YES, and determination is made that fuel has been refueled, processing proceeds to step 6, at which determination is made as to whether or not the ethanol concentration CEFL of the main tank fuel detected by the ethanol concentration sensor 42 at that point is higher than a pre-refueling ethanol concentration CEFLZ. If the answer at step 6 is NO because the amount of ethanol component in the main tank fuel has not effectively increased due, for example, to the refueled fuel having a low ethanol concentration, and after executing steps 4 and 5 such that the separator device 12 is not operated, the processing is ended.

However, if the answer at step 6 is YES, since the amount of ethanol component in the main tank fuel has effectively increased due to refueling, the separator device operation flag F_SPR is set to 1 (step 7) to indicate that the separator device 12 should be operated, the separator device 12 is operated (step 8), and the processing is ended.

If the answer at step 1 is NO and the IG. SW 46 has not only just been turned ON, determination is made as to whether or not the separator device operation flag F_SPR is set to 1 (step 9). If the answer is YES and the separator device 12 is being caused to operate at refueling, a high octane fuel amount QFL2 inside the sub tank 13 is computed (step 10). The high octane fuel amount QFL2 is computed by, for example, multiplying a liquid surface level LFL2 detected by the second level sensor 44 at that point by the lateral cross-section area of the sub tank 13.

Next, determination is made as to whether or not the computed high octane fuel amount QFL2 is a specific upper limit value Q_LMTH or greater (step 11). If the answer is NO, the processing is ended immediately and the separator device 12 continues to operate. However, if the answer is YES, and the high octane fuel amount QFL2 has reached the upper limit value Q_LMTH, a sufficient amount of the high octane fuel has been secured inside the sub tank 13 by operating the separator device 12, and after executing steps 4 and 5 to stop operation of the separator device 12, the processing is ended.

If the answer at step 9 is NO, and the separator device 12 was not being operated or has finished operating at refueling, the processing is ended immediately.

As described above, in the present embodiment, when determination is made that the main tank 11 has been refueled, operation of the separator device 12 is prioritized in order to generate the high octane fuel. This makes it possible to avoid wasteful consumption of the ethanol component (high octane component) of the fuel due to the refueled fuel being supplied from the main tank 11 to the engine 3 without operating the separator device 12. This thereby enables the ethanol component of the fuel to be effectively utilized to secure a sufficient amount of the high octane fuel. Accordingly, the high octane fuel can be employed without running out when in a state operating under high load, thereby enabling an improvement in the performance of the engine 3 in terms of output, fuel consumption, and the like.

Operation of the separator device 12 is continued until the high octane fuel amount QFL2 reaches the upper limit value Q_LMTH. This thereby enables the amount of the high octane fuel secured to be made as large as possible, while maximizing utilization of the ethanol component of the fuel.

In addition to the condition of refueling having been performed, the separator device 12 is operated on the condition that the ethanol concentration CEFL of the main tank fuel immediately after refueling is greater than the pre-refueling ethanol concentration CEFLZ. The separator device 12 is thereby operated only in cases in which there has been an effective increase in the amount of ethanol component of the fuel due to refueling, thereby enabling the high octane fuel to be generated efficiently.

Due to operating the separator device 12 at refueling, the gaseous high octane fuel is cooled by fuel that is in a low temperature state immediately after refueling, thereby enabling good high octane fuel generation as a result of stable high performance condensing.

Figure 5:
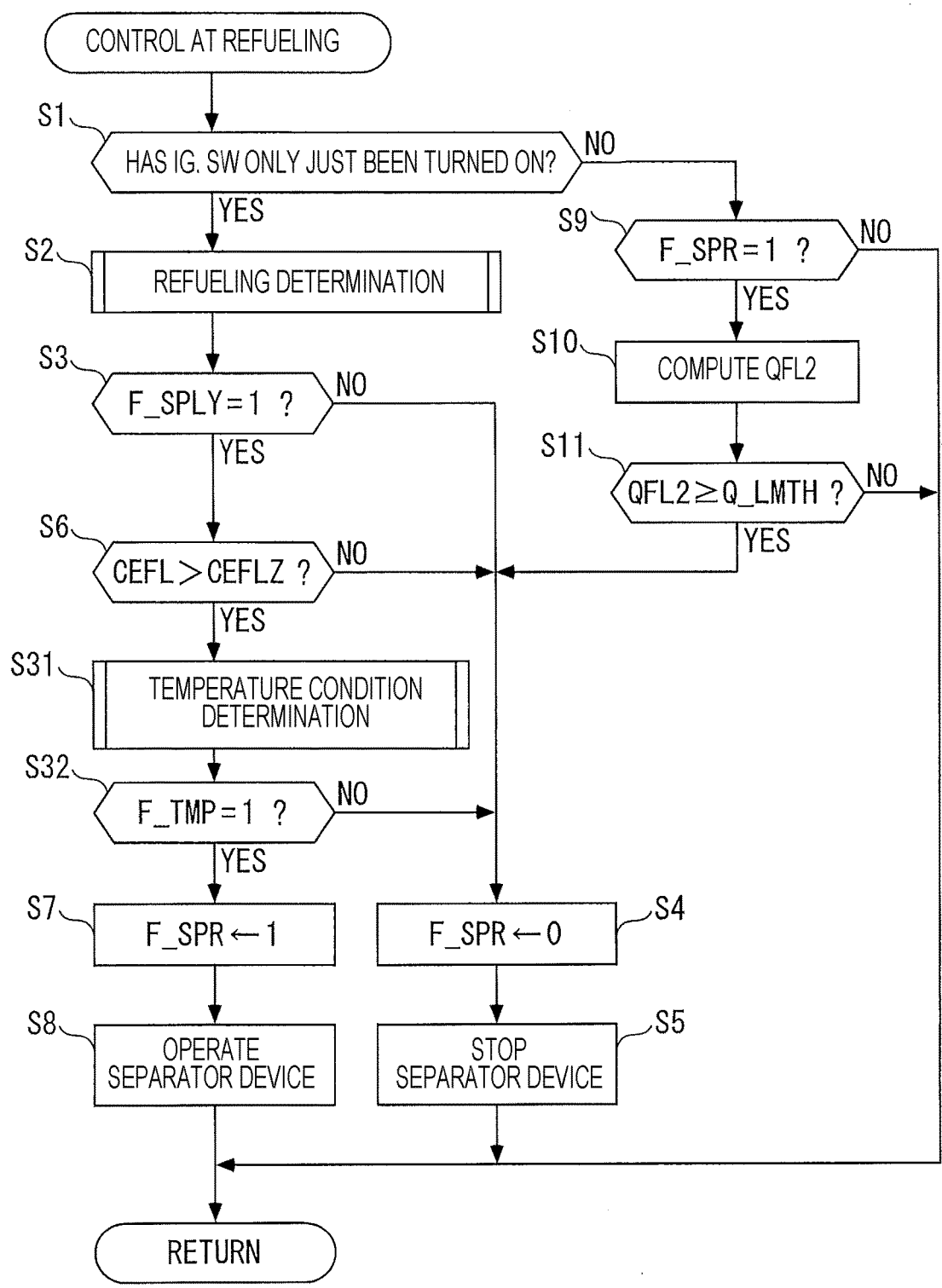
FIG. 5 is a flowchart illustrating control processing at refueling for a separator device according to a second embodiment.

Next, explanation follows regarding control processing at refueling for the separator device 12 according to a second embodiment of the present disclosure, with reference to FIG. 5. As is clear when compared against FIG. 3, in this processing, processing relating to temperature condition determination (steps 31, 32), this being an additional condition for operating the separator device 12, has been added to the processing according to the first exemplary embodiment. Explanation follows regarding this processing, with a focus on the additional processing. This processing is also executed repeatedly by the ECU 2 at a specific time interval.

Figure 6:
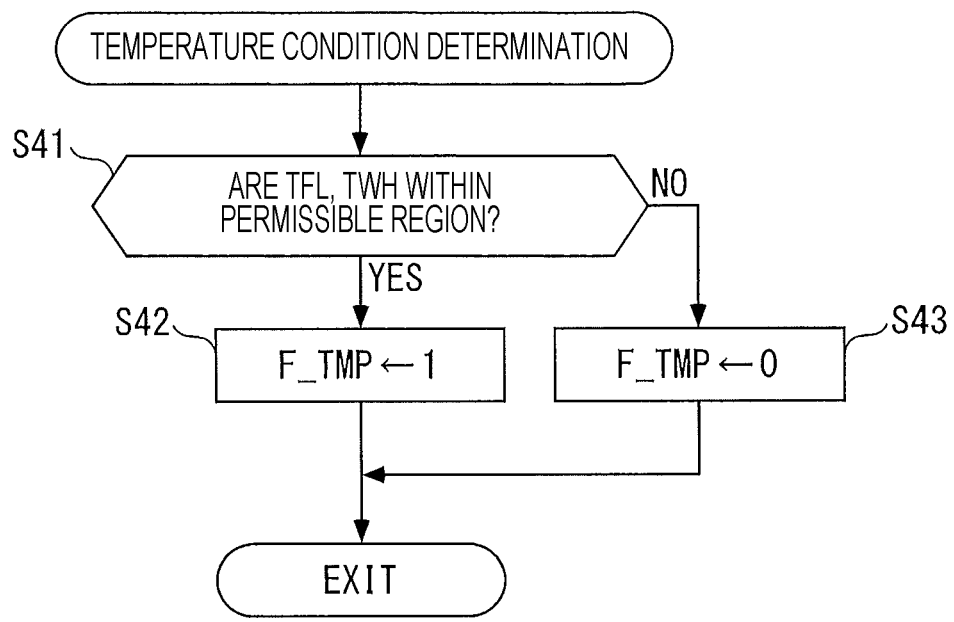
FIG. 6 is a flowchart illustrating a sub-routine for temperature condition determination processing, illustrated in FIG. 5.

Steps 1 to 3 and step 6 of this processing are similar to those of the first embodiment. Temperature condition determination processing (step 31) is executed in cases in which the answer at step 6 is YES, namely, when determination is made that refueling has been performed, and the ethanol concentration CEFL is greater than the pre-refueling ethanol concentration CEFLZ. This sub-routine is illustrated in FIG. 6.

Figure 7:
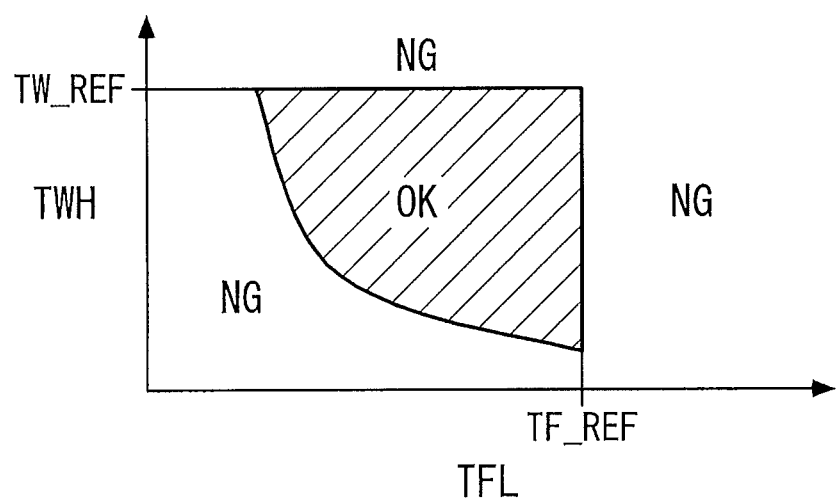
FIG. 7 is a map employed to determine temperature conditions in the determination processing illustrated in FIG. 6.

In this processing, first, at step 41, determination is made as to whether or not the detected main tank fuel temperature TFL and cooling water temperature TWH are within a permissible (OK) region of the map illustrated in FIG. 7. This map distinguishes between a permissible region in which good fuel separation can be performed by the separator device 12, and other regions designated as prohibited (NG) regions, based on the main tank fuel temperature TFL and the cooling water temperature TWH, and is produced based on the following considerations.

Based on the configuration and functionality of the separator device 12 described above, the final amount of liquid high octane fuel (a high octane fuel generation amount) generated by the separator device 12 is expressed by the following Equation 1.

$$\text{high octane fuel generation amount} = \text{gaseous fuel amount} - \text{uncondensed fuel amount} \quad (1)$$

The gaseous fuel amount is the amount of gaseous high octane fuel separated by the separation membrane 19 of the separator device 12, and is related to the separation performance of the separation membrane 19. The separation performance increases the higher the temperature of the fuel supplied to the separation membrane 19, due to the permeation rate of the fuel permeating through the separation membrane 19 increasing. The main tank fuel supplied to the separation membrane 19 is heated in advance by the cooling water in the cooling water chamber 23a of the heater 17. Due to the above relationship, the separation performance of the separation membrane 19 increases, and the gaseous fuel amount becomes greater, the higher the cooling water temperature TWH. However, operation of the separator 15 is prohibited if the cooling water temperature TWH becomes too high, in order to prevent phenomena such as cavitation due to excessive warming of the fuel, as well as changes in the properties of, and evaporation of, the fuel.

The uncondensed fuel amount in Equation 1 is the amount of fuel out of the gaseous high octane fuel separated by the separation membrane 19 that is not condensed in the condenser 20, and is related to the condensing performance of the condenser 20. Since, as described above, the condenser 20 condenses using the main tank fuel as a coolant, the lower the main tank fuel temperature TFL, the higher the condensing performance of the condenser 20, and the smaller the uncondensed fuel amount.

In the map of FIG. 7, the permissible region in which operation of the separator device 12 is permitted is set as a region in which both good separation performance of the separation membrane 19 and good condensing performance of the condenser 20 can be obtained based on the main tank fuel temperature TFL and the cooling water temperature TWH in consideration of the above relationships. The permissible region is a region in which, fundamentally, the main tank fuel temperature TFL is a specific temperature TF-REF or lower, and the cooling water temperature TWH is a specific temperature TW-REF or lower. This is since when the main tank fuel temperature TFL is higher than the specific temperature TF-REF, it may not be possible to obtain the desired condensing performance, and when the cooling water temperature TWH is higher than the specific temperature TW-REF, cavitation due to excessive warming of the fuel, and changes in the properties of, or evaporation of the fuel may occur.

Moreover, if the cooling water temperature TWH is too low, the or if the main tank fuel temperature TFL is too low, the fuel is insufficiently heated, and separation performance could decrease due to insufficient warming. Accordingly, such regions are also set as prohibited regions.

The map in FIG. 7 is set as described above. Accordingly, when the answer at step 41 in FIG. 6 is YES and the main tank fuel temperature TFL and the cooling water temperature TWH fall within the permissible region of the map, a temperature conditions flag F_TMP is set to 1 (step 42) to indicate that the temperature conditions for operating the separator device 12 have been satisfied, and the processing is ended. However, if the answer at step 41 is NO and the main tank fuel temperature TFL or the cooling water temperature TWH fall in a prohibited region, the temperature conditions flag F_TMP is set to 0 (step 43) to indicate that the temperature conditions have not been satisfied, and the processing is ended.

Returning to FIG. 5, at step 32 following the temperature condition determination processing of step 31, determination is made as to whether or not the temperature conditions flag F_TMP is at 1. If the answer is NO, and the temperature conditions have not been satisfied, steps 4 and 5 are executed so as to set the separator device operation flag F_SPR to 0 to indicate that the separator device 12 is not to be operated, and keep the separator device 12 in an inactive state. The processing is then ended.

If the answer at step 32 is YES, and the temperature conditions have been satisfied, steps 7 and 8 are executed so as to set the separator device operation flag F_SPR to 1 to indicate that the separator device 12 should be operated, and operate the separator device 12. The processing is then ended.

As described above, according to the present embodiment, the separator device 12 is operated when the temperature conditions relating to the main tank fuel temperature TFL and the cooling water temperature TWH have been satisfied in addition to the condition of refueling of the main tank 11 having been performed and the condition of the amount of ethanol component in the main tank fuel having increased due to refueling. This thereby enables more appropriate operation of the separator device 12 so as to reflect the temperature conditions at refueling.

Note that the present disclosure is not limited to the embodiments described, and various configurations may be implemented. For example, in the embodiments, at step 23 in FIG. 4, determination as to whether or not refueling has been performed is executed using the following Equation 2 employing the main tank fuel amount QFL1 immediately after the IG. SW 46 has been turned ON and the previous main tank fuel amount QFL1Z.

$$QFL1 > QFL1Z \quad (2)$$

The following Equation 3 may be employed in place of Equation 2 as the refueling determination equation.

$$QFL1 > QFL1Z + \alpha \cdot QMAX \quad (3)$$

wherein QMAX is the maximum capacity of the main tank 11, and α is a specific increase coefficient (0<α<1). Accordingly, refueling is determined to have been performed when the main tank fuel amount QFL1 has increased by more than α·QMAX, using the maximum capacity QMAX as a reference, between the IG. SW 46 being switched OFF and being switched ON. This thereby enables refueling to be determined accurately.

Alternatively, the following Equation 4 may be employed as the refueling determination equation.

$$QFL1 > (1+\beta) \cdot QFL1Z \quad (4)$$

wherein β is a specific increase coefficient (0<β). Accordingly, refueling is determined to have been performed when the main tank fuel amount QFL1 has increased by more than β·QFL1Z, using the previous main tank fuel amount QFL1Z as a reference, between the IG. SW 46 being switched OFF and being switched ON. Similarly to Equation 3, this enables refueling to be determined accurately.

In the examples described above, refueling determination is performed using the main tank fuel amount QFL1 converted from the detected liquid surface level LFL1 of the main tank fuel. However, the liquid surface level LFL1 may be used as-is to make determination in a similar manner. This similarly applies to step 11 in FIG. 3, where instead of comparing the high octane fuel amount QFL2 converted from the detected liquid surface level LFL2 of the high octane fuel against the upper limit value Q_LMTH, the liquid surface level LFL2 may be compared against the upper limit value.

At step 6 in FIG. 3, determination that the amount of ethanol component has increased due to refueling is performed by comparing the ethanol concentration CEFL immediately after refueling the main tank fuel against the pre-refueling ethanol concentration CEFLZ. Alternatively, the ethanol concentration CEFL immediately after refueling may be compared against an appropriate specific threshold value. Alternatively, the amounts of ethanol component in the main tank fuel before and after refueling may respectively be computed using the ethanol concentration CEFL and the liquid surface level LFL1 (main tank fuel amount QFL1), with determination being made based on a result of comparing the two against each other.

In the embodiments, the ethanol concentration CEFL of the main tank fuel is detected by the ethanol concentration sensor 42; however, other appropriate methods may be employed. For example, the oxygen concentration in exhaust gas when the main tank fuel combusts may be detected, and the ethanol concentration may be estimated from the detection values. Alternatively, a knocking occurrence state when the main tank fuel combusts may be detected, with the ethanol concentration being estimated from these detection values.

In the embodiments, configuration is made in which the low octane fuel separated by the separator device 12 is returned to the main tank 11, and is supplied to the separator device 12 and the engine 3 as main tank fuel together with refueled fuel. Alternatively, the separated low octane fuel may be housed separately to the main tank 11 in a dedicated tank, and supplied to the engine from the dedicated tank.

Moreover, minor configuration details may be modified as appropriate within the scope of the spirit of the present disclosure.

A first aspect of the present disclosure describes an internal combustion engine fuel supply system that separates fuel into high octane fuel with a higher octane number and low octane fuel with a lower octane number, and supplies fuel to an internal combustion engine 3. The internal combustion engine fuel supply system includes: a first fuel tank (a main tank 11 of an embodiment (similar applies throughout this section)) that stores fuel that has been refueled; a separator device 12 that separates fuel supplied from the first fuel tank into high octane fuel and low octane fuel; a second fuel tank (sub tank 13) that stores the separated high octane fuel; a refueling determination unit (ECU 2, step 2 in FIG. 3, FIG. 4) that determines whether or not fuel has been refueled in the first fuel tank; and a controller (ECU 2, steps 3, 7, 8 in FIG. 3) that causes the separator device 12 to operate when determined that fuel has been refueled in the first fuel tank.

According to this configuration, fuel is supplied to the separator device from the first fuel tank, and is separated into low octane fuel and high octane fuel by the separator device. The separated high octane fuel is stored in the second fuel tank. Determination is made as to whether or not fuel has been refueled in the first fuel tank, and the separator device is caused to operate when determined that fuel has been refueled.

In this manner, when fuel has been refueled in the first fuel tank, operation of the separator device is prioritized in order to generate the high octane fuel. This makes it possible to avoid wasteful consumption of the high octane component of the fuel due to the refueled fuel being supplied to the internal combustion engine without operating the separator device. This thereby enables the high octane component of the fuel to be effectively utilized to secure a sufficient amount of the high octane fuel. Accordingly, the high octane fuel can be employed without running out when in a state operating under high load, thereby enabling improved performance of the internal combustion engine.

In a second aspect of the disclosure, the internal combustion engine fuel supply system of the first aspect may further include a high octane fuel amount parameter acquisition unit (second level sensor 44, ECU 2,) that acquires a high octane fuel amount parameter (liquid surface level LFL2 of the high octane fuel, high octane fuel amount QFL2) indicating the amount of high octane fuel stored in the second fuel tank. After starting operation of the separator device 12, the controller continues operation of the separator device 12 until the acquired high octane fuel amount parameter reaches a specific upper limit value Q_LMTH (steps 9 to 11 in FIG. 3).

According to this configuration, operation of the separator device is continued until the high octane fuel amount parameter indicating the amount of high octane fuel reaches the upper limit value. Utilization of the high octane component of the fuel is thereby maximized, enabling the amount of high octane fuel amount secured to be made as large as possible, and is thereby capable of improving on the effects of the first aspect described above.

In a third aspect of the disclosure, the internal combustion engine fuel supply system of the first aspect or the second aspect may further include a high octane component amount parameter acquisition unit (ethanol concentration sensor 42) that acquires a high octane component amount parameter (ethanol concentration CEFL) indicating the amount of high octane component in fuel stored in the first fuel tank. The controller causes the separator device to operate under a condition that the acquired high octane component amount parameter has increased between before and after fuel refueling (steps 6 to 8 in FIG. 3).

The concentration of the high octane component in refueled fuel is not necessarily uniform. Accordingly, when fuel with a low concentration of high octane component is refueled, even if the separator device is operated, it may not be possible to generate high octane fuel efficiently since the high octane component amount of the fuel has not increased significantly. According to this configuration, the separator device is operated under the condition that the high octane component amount parameter indicating the amount of high octane component in the fuel has increased between before and after fuel refueling, in addition to the condition of refueling having been performed. This thereby enables the separator device to be operated only in cases in which there has been an effective increase in the high octane component amount of the fuel due to refueling, thereby enabling high octane fuel to be generated efficiently.

In a fourth aspect of the disclosure, configuration may be made in which in the internal combustion engine fuel supply system of any one of the first aspect to the third aspect, the separator device 12 includes: a separation membrane 19 that separates fuel into gaseous high octane fuel and liquid low octane fuel; and a condenser 20 that condenses the separated gaseous high octane fuel into liquid high octane fuel by cooling the separated gaseous high octane fuel using fuel supplied from the first fuel tank as a coolant.

According to this configuration, the fuel in the first fuel tank is employed as a coolant to cool and condense the gaseous high octane fuel separated by the separation membrane. Normally, fuel is stored in an underground tank at a gas station until just before refueling, and is therefore maintained in a stable low temperature state regardless of the outside temperature. Accordingly, due to operating the separator device at refueling, as in the present disclosure, the gaseous high octane fuel is cooled by fuel that is in a low temperature state immediately after refueling. This thereby enables efficient high octane fuel generation as a result of stable high performance condensing.

Obviously, numerous modifications and variations of the present invention are possible in light of the above teachings. It is therefore to be understood that within the scope of the appended claims, the invention may be practiced otherwise than as specifically described herein.

What is claimed is:

1. An internal combustion engine fuel supply system that separates fuel into high octane fuel with a higher octane number and low octane fuel with a lower octane number and supplies fuel to an internal combustion engine, the internal combustion engine fuel supply system comprising:
   a first fuel tank that stores fuel;
   an electronic control unit operated system comprising a fuel amount sensor operable to detect a first amount of the fuel stored in the first fuel tank when an ignition switch is turned off and to detect a second amount of the fuel stored in the first fuel tank when the ignition switch is turned on immediately after the ignition switch had been turned off;
   a separator device that separates fuel supplied from the first fuel tank into high octane fuel and low octane fuel the separator device including a separation membrane that separates fuel into gaseous high octane fuel and liquid low octane fuel; and
   a second fuel tank that stores the separated high octane fuel; wherein the electronic control unit operated system is configured to operate the separator device by supplying fuel to be separated to the separator device when the second amount is larger than the first amount.

2. The internal combustion engine fuel supply system according to claim 1, further comprising:
   a high octane fuel amount parameter acquisition unit that acquires a high octane fuel amount parameter indicating the amount of high octane fuel stored in the second fuel tank; wherein,
   after starting operation of the separator device, the electronic control unit continues operation of the separator device until the acquired high octane fuel amount parameter reaches a specific upper limit value.

3. The internal combustion engine fuel supply system according to claim 1, further comprising:
   a high octane component amount parameter acquisition unit that acquires a high octane component amount parameter indicating the amount of high octane component in fuel stored in the first fuel tank; wherein,
   the electronic control unit causes the separator device to operate when the acquired high octane component amount parameter has increased between before and after fuel refueling.

4. The internal combustion engine fuel supply system according to of claim 1, wherein the separator device includes a condenser that condenses the separated gaseous high octane fuel into liquid high octane fuel by cooling the separated gaseous high octane fuel using fuel supplied from the first fuel tank as a coolant.

5. An internal combustion engine fuel supply system comprising:
   a first fuel tank to store fuel;
   an electronic control unit operated system comprising a fuel amount sensor operable to detect a first amount of the fuel stored in the first fuel tank when an ignition switch is turned off and to detect a second amount of the fuel stored in the first fuel tank when the ignition switch is turned on immediately after the ignition switch had been turned off; and
   a separator connected to the first fuel tank to separate the fuel supplied from the first fuel tank into a high octane fuel and a low octane fuel which are to be supplied to an internal combustion engine, the high octane fuel having a first octane number, the low octane fuel having a second octane number lower than the first octane number, the separator including a separation membrane to separate the fuel into a gaseous high octane fuel and a liquid low octane fuel;
   wherein the electronic control unit operated system is configured to operate the separator by supplying fuel to be separated to the separator to separate the fuel into the high octane fuel and the low octane fuel when the second amount is larger than the first amount.

6. The internal combustion engine fuel supply system according to claim 5, further comprising:
   a second fuel tank connected to the separator to store the high octane fuel separated by the separator, wherein the electronic control unit is configured to:
   acquire a high octane fuel amount parameter indicating an amount of the high octane fuel stored in the second fuel tank; and
   continue operating the separator until the high octane fuel amount parameter reaches an upper limit value after starting operating the separator.

7. The internal combustion engine fuel supply system according to claim 5,
   wherein the electronic control unit is configured to:

acquire a high octane component amount parameter indicating an amount of a high octane component in the fuel stored in the first fuel tank; and continue operating the separator until the high octane component amount parameter has increased after the fuel has been supplied.

8. The internal combustion engine fuel supply system according to claim 5, wherein the separator includes a condenser to condense the gaseous high octane fuel into a liquid high octane fuel by cooling the gaseous high octane fuel using the fuel supplied from the first fuel tank as a coolant.

9. An internal combustion engine fuel supply method comprising:

detecting a first amount of fuel stored in a first fuel tank when an ignition switch is turned off;

detecting a second amount of the fuel stored in the first fuel tank when the ignition switch is turned on immediately after the ignition switch is had been turned off:

determining whether the second amount is larger than the first amount; and operating a separator to separate the fuel supplied from the first fuel tank into a high octane fuel and a low octane fuel which are to be supplied to an internal combustion engine, by supplying fuel to be separated to the separator, when it is determined that the second amount is larger than the first amount, the high octane fuel having a first octane number, the low octane fuel having a second octane number lower than the first octane number, the separator including a separation membrane to separate the fuel into a gaseous high octane fuel and a liquid low octane fuel.

10. The internal combustion engine fuel supply method according to claim 9, wherein the separator includes a condenser to condense the gaseous high octane fuel into a liquid high octane fuel by cooling the gaseous high octane fuel using the fuel supplied from the first fuel tank as a coolant.

* * * * *